US008228523B2

(12) United States Patent
Fujikura

(10) Patent No.: US 8,228,523 B2
(45) Date of Patent: Jul. 24, 2012

(54) IMAGE FORMING APPARATUS

(75) Inventor: Shuichi Fujikura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1122 days.

(21) Appl. No.: 11/690,227

(22) Filed: Mar. 23, 2007

(65) Prior Publication Data

US 2007/0229858 A1 Oct. 4, 2007

(30) Foreign Application Priority Data

Mar. 27, 2006 (JP) ................................. 2006-086758

(51) Int. Cl.
*G06K 15/00* (2006.01)
*G03G 15/16* (2006.01)
*G03G 15/01* (2006.01)

(52) U.S. Cl. .......................... 358/1.14; 399/66; 399/299

(58) Field of Classification Search .................... 399/36, 399/66, 76, 96, 169, 299, 301, 302
See application file for complete search history.

(56) References Cited

U.S. PATENT DOCUMENTS

| | | | | |
|---|---|---|---|---|
| 5,652,650 | A * | 7/1997 | Menjo et al. | 399/226 |
| 6,408,157 | B1 * | 6/2002 | Tanaka et al. | 399/301 |
| 6,463,247 | B1 * | 10/2002 | Kawano et al. | 399/299 |
| 6,526,237 | B2 * | 2/2003 | Endo | 399/49 |
| 7,330,685 | B2 * | 2/2008 | Matayoshi | 399/299 |
| 2004/0131407 | A1 * | 7/2004 | Sato et al. | 399/394 |
| 2004/0253008 | A1 * | 12/2004 | Chapman et al. | 399/13 |
| 2005/0249523 | A1 * | 11/2005 | Shibuya et al. | 399/167 |
| 2006/0204263 | A1 * | 9/2006 | Watanabe | 399/66 |

FOREIGN PATENT DOCUMENTS

| | | |
|---|---|---|
| JP | 11-184190 | 7/1999 |
| JP | 2002-72611 | 3/2002 |
| JP | 2002-318508 | 10/2002 |
| JP | 2005-169672 | 6/2005 |
| JP | 2005-266425 | 9/2005 |
| JP | 2006-184651 | 7/2006 |

* cited by examiner

*Primary Examiner* — Marivelisse Santiago Cordero
*Assistant Examiner* — Mesfin Getaneh
(74) *Attorney, Agent, or Firm* — Rabin & Berdo, P.C.

(57) ABSTRACT

An image forming apparatus in which multiple image forming units for forming a developer image arranged along a prescribed medium feeding path are disposed in a manner to contact and face a belt component, the image forming apparatus includes an image formation driving unit for driving said multiple image forming units; a belt component driving unit for driving said belt component; and a drive control unit for supplying a drive command to said belt component driving unit and said image formation driving unit, said drive control unit sequentially initiating the driving of said image forming units from said image forming unit located downstream in the medium feeding path, after initiating the driving of said belt component drive unit.

7 Claims, 8 Drawing Sheets

IMAGE FORMING APPARATUS

BACKGROUND OF THE INVENTION

1. Field of the Invention

The present invention relates to an image forming apparatus.

2. Description of Related Art

Conventionally, in a full color image forming apparatus in which multiple photosensitive drums are made to contact a feeding belt and rotate, when printing information is sent from a host apparatus such as an information processing apparatus, activation of the photosensitive drums and activation of the feeding belt begin at approximately the same time to print a developer image, based on the printing information, onto a recording medium such as paper.

However, in conventional image forming apparatuses, because the printing process is begun without eliminating the sag previously existing in the feeding belt, a color shift occurs in the image printed on the paper fed with the sag, which leads to the problem that a high quality image cannot be printed. Here, the feeding belt is driven a prescribed amount before initiating the printing process to eliminate the sag arising in the feeding belt, but such a case is not desirable because of the time required from when the printing apparatus receives the printing information to the time when the printing process is initiated.

SUMMARY OF THE INVENTION

It is an objective of the present invention, in consideration of the above situation, to provide an image forming apparatus that can eliminate the sag arising in the feeding belt to print the high quality image without unnecessary driving of the feeding belt.

To achieve the aforementioned aim, the image forming apparatus according to the present invention is an image forming apparatus in which multiple image forming units for forming a developer image arranged along a prescribed medium feeding path are disposed in a manner to contact and face a belt component. The image forming apparatus comprising also contains an image formation driving unit for driving the multiple image forming units, a belt component driving unit for driving the belt component, and a drive control unit for supplying a drive command to the belt component driving unit and the image formation driving unit. In the image forming apparatus, the drive control unit sequentially initiates the driving of the image forming units from the image forming unit located downstream in the medium feeding path after initiating the driving of the belt component drive unit.

With this structure, the image forming apparatus can eliminate the sag in the belt component formed adjacent to the locations of each of the image forming units because the image forming apparatus sequentially initiates driving from the units disposed downstream in the medium feeding path.

In the manner described above, the image forming apparatus according to the present invention can eliminate the sag arising in the feeding belt to print the high quality image without unnecessary driving of the feeding belt.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein.

DESCRIPTION OF PREFERRED EMBODIMENTS

The following is a detailed description referencing diagrams concerning a concrete embodiment according to the present invention. The following embodiments are described in detail with a printer that fixes multiple colors of developer onto the recording body, such as paper, using the photosensitive drum and feeding belt used as an example, but the present invention may also be applied to an MFP (Multifunctional Peripheral), copy machine, or the like.

Figure 1:
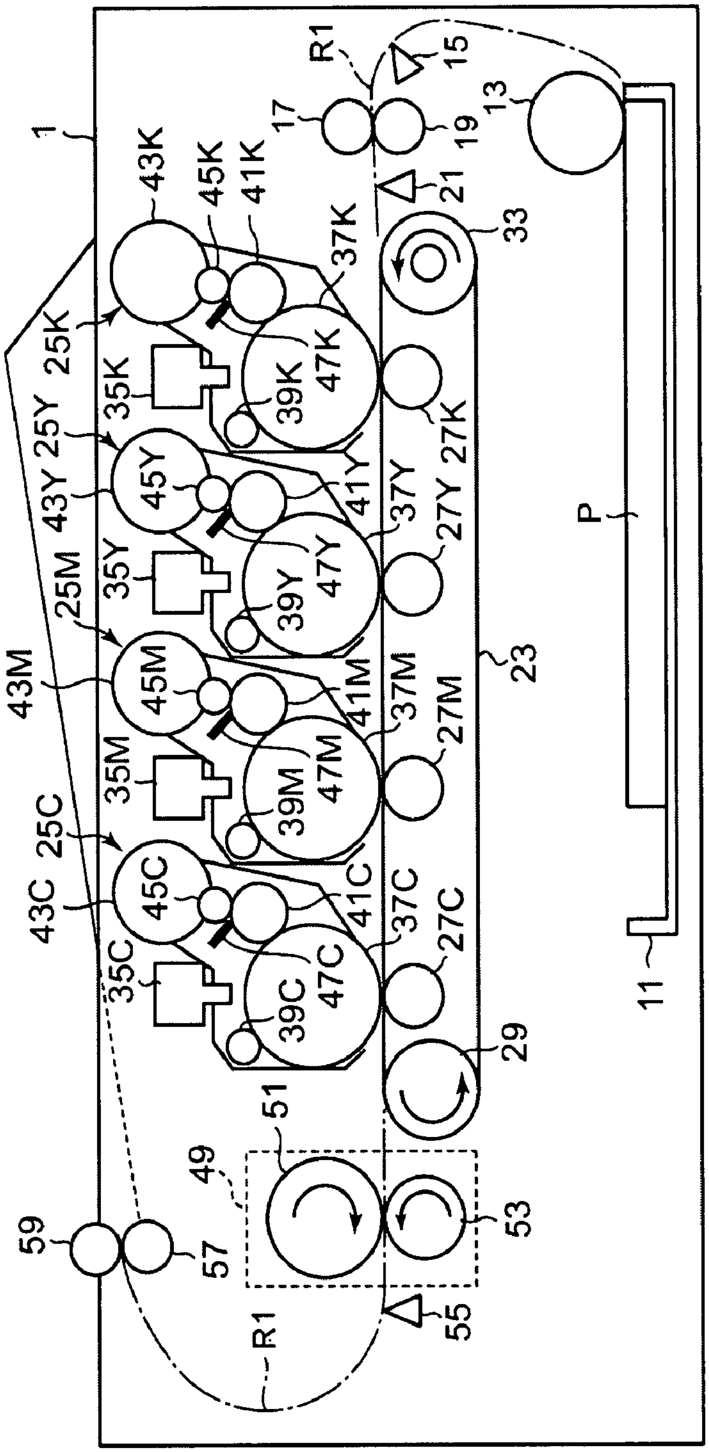
FIG. 1 is a cross sectional diagram of the image forming apparatus according to a first embodiment, describing the structure of the same image forming apparatus.

As shown in FIG. 1, the image forming apparatus 1 contains a paper tray 11 for storing the paper P, serving as the recording medium, and a hopping roller 13 for sending out the paper P stored in the print tray 11 in a direction of a prescribed medium feeding path R1. When printing information is sent from the host apparatus such as an information processing apparatus, not shown, the image forming apparatus 1 sends out the paper P stored in the print tray 11 in the direction of the prescribed medium feeding path R1.

The medium feeding path R1 contains a paper sensor 15 for detecting a location of the paper P in the medium feeding path R1 and a paper supply roller 17 and a paper supply roller 19 for sending the paper P in a downstream direction in the medium feeding path R1 by sandwiching and feeding the paper P. Furthermore, the image forming apparatus 1 contains a paper sensor 21, located downstream from the paper supply roller 17 and the paper supply roller 19 in the medium feeding path R1, for detecting that the paper P has arrived at the prescribed position.

The image forming apparatus 1 contains, downstream from the paper sensor 21 in the medium feeding path R1, a feeding apparatus 23 for feeding the paper P, development apparatuses 25C, 25M, 25Y, and 25K for developing the developer image based on the printing information, and transfer rollers 27C, 27M, 27Y, and 27K for transferring the developer image developed by the development apparatuses 25C, 25M, 25Y, and 25K onto the paper P fed by the feeding apparatus 23.

The feeding apparatus 23 feeds the paper P in a downstream direction in the medium feeding path R1 at a prescribed time while the prescribed development process and transfer process are executed by the development apparatuses 25C, 25M, 25Y, and 25K and the transfer rollers 27C, 27M, 27Y, and 27K, respectively. Such a feeding apparatus 23 contains a drive roller 29 for driving the feeding apparatus 23, a feeding belt 31 that is driven by the rotation of the drive roller 29, and a support roller 33 for supporting the feeding belt 31 along with the drive roller 29.

The feeding belt 31 is stretched between the drive roller 29 and the support roller 33 and is made to rotate with the support roller 33, which is in sync with the rotation of the drive roller 29, through the rotation of the drive roller 29.

The development apparatuses 25C, 25M, 25Y, and 25K each develop cyan, magenta, yellow, and black developer images, respectively. In addition, because the development apparatuses 25C, 25M, 25Y, and 25K have identical structures, the following detailed description is given using development "development apparatus 25" as a general name. Furthermore, in the same manner, the transfer rollers 27C, 27M, 27Y, and 27K are given the general name "transfer roller 27" in the following detailed description.

The development apparatus 25 develops the developer image based on the printing information sent from the information processing apparatus, not shown. Such a development apparatus 25 contains a photosensitive drum 37 serving as an image carrier for carrying the latent image based on the printing information and exposed by an exposure apparatus 35, a charge roller 39 serving as a charge unit for uniformly charging the surface of the photosensitive drum 37, a development roller 41 for serving as a developer carrier for developing the developer image by fixing developer to the latent image carried on the surface of the photosensitive drum 37, and a supply roller 45 serving as a toner supply unit for supplying developer stored in a cartridge 43 to the development roller 41. Furthermore, a blade 47, serving as a toner layer regulation unit for ensuring the uniform distribution of the developer supplied to the development roller 41 from the supply roller 45, is disposed to contact the development roller 41.

In such a development apparatus 25, the charge roller 39 charges the surface of the photosensitive drum 37 to approximately −1000 V, for example, when the printing process is initiated by the image forming apparatus 1. Next, the exposure apparatus 35 exposes the surface of the photosensitive drum 37 to form the latent image on the surface of the photosensitive drum 37 by removing the charge from certain portions of the surface of the photosensitive drum 37. At this time, the developer, to which a prescribed bias voltage is applied, stored in the cartridge 43 is supplied to the development roller 41 by the supply roller 45. The development roller 41 then develops the developer image based on the printing information on the surface of the photosensitive drum 37 by fixing the toner to which the bias voltage is applied to the latent image on the surface of the photosensitive drum 37.

The developer image formed on the photosensitive drum 37 is transferred to the paper P, which is fed along the feeding path at a prescribed time, by the transfer roller 27. Specifically, the photosensitive drum 37 and the feeding apparatus 23 are driven at approximately the same speed so that the photosensitive drum 37 sandwiches and feeds the paper P together with the transfer roller 27 to which a bias voltage of approximately 2000 V is applied by a power source, not shown, in correspondence with the timing by which the paper P is fed by the feeding apparatus 23. At this time, the developer image formed on the photosensitive drum 37 is drawn towards the charge roller 27 because of the potential difference between the photosensitive drum 37 and the charge roller 27. The developer image is then transferred to the paper P that is fed between the photosensitive drum 37 and the charge roller 27.

The photosensitive drum 37, the charge roller 39, the development roller 41, the supply roller 45, and the blade 47 are disposed in each of the development apparatuses 25C, 25M, 25Y, and 25K and the exposure device 35 is also disposed to correspond to each of the development apparatuses 25C, 25M, 25Y, and 25K. In the image forming apparatus 1, the aforementioned development process and transfer process are executed by all of the development apparatuses 25C, 25M, 25Y, and 25K so that the developer image based on the printing information is sequentially transferred to the paper P. The paper P to which the developer image based on the printing information is transferred is then sent by the feeding apparatus 23 to a fixing apparatus 49 disposed downstream in the medium feeding path R1.

The fixing apparatus 49 contains a fixing roller 51 having an internal heat source such as a halogen lamp, not shown, and a pressure roller 53 that, together with the fixing roller 51, sandwiches and feeds the paper P. When the paper P to which the developer image is transferred is sent to such a fixing apparatus 49, the fixing apparatus 49 the developer transferred to the paper P is melted and fixed to the paper P by the previously heated fixing roller 51 and the pressure roller 53 that presses against the fixing roller 51. Next, the paper P to which the developer image was fixed by the fixing apparatus 49 is sent out by the fixing apparatus 49 in a direction further downstream in the medium feeding path R1. When the paper P is sent out from the fixing apparatus 49, the paper sensor 55 detects the paper P and the feeding roller 57 and feeding roller 59 disposed downstream from the paper sensor 55 are activated. After reaching the feeding roller 57 and feeding roller 59, the paper P is ejected by the feeding roller 57 and feeding roller 59 to a stack, not shown, disposed outside the image forming apparatus 1 to provide a user with the paper P on which the developer image based on the printing information is formed.

The following is a detailed description of a control system of the image forming apparatus 1 having the structure described above.

Figure 2:
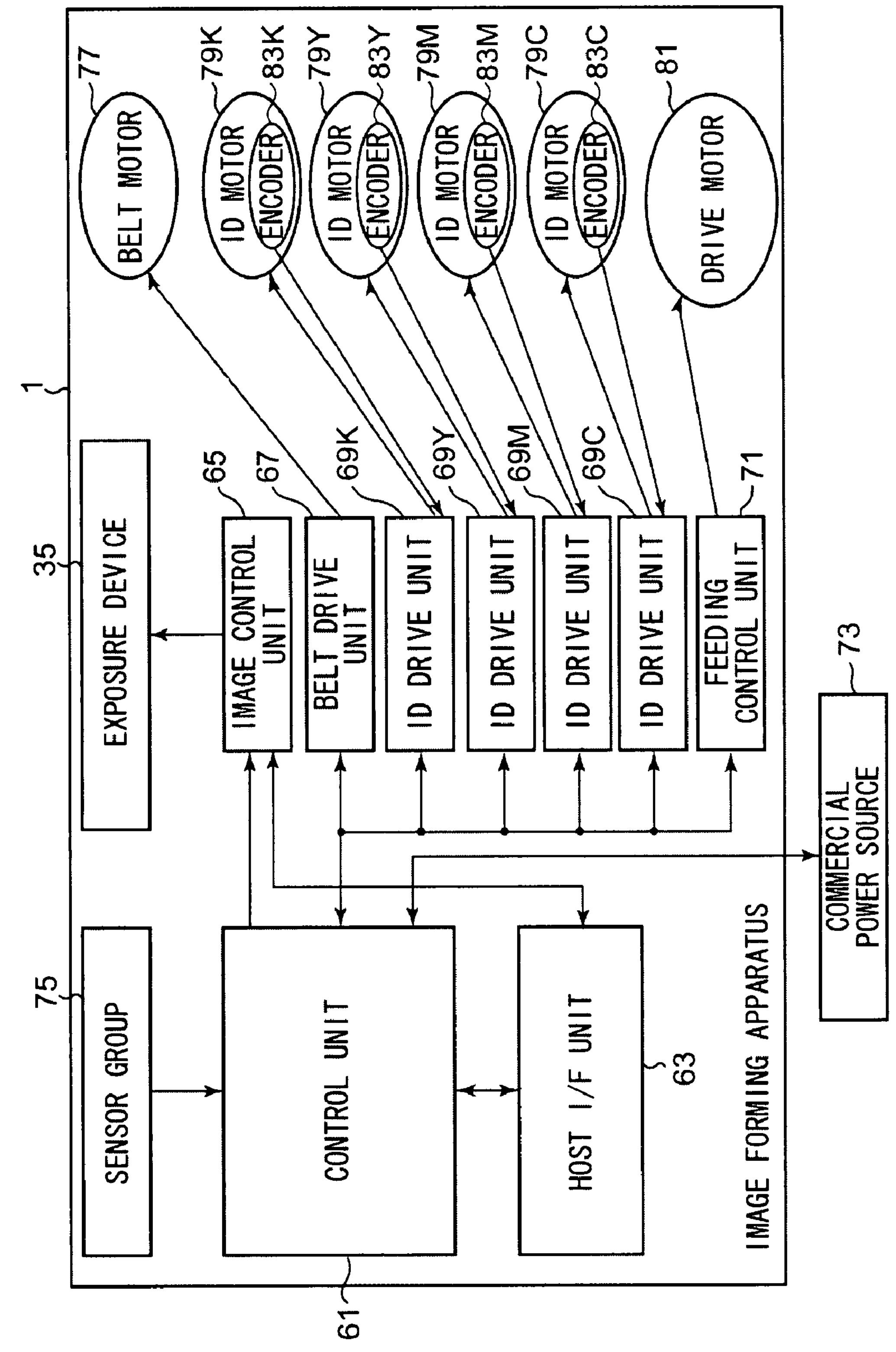
FIG. 2 is a block diagram of the image forming apparatus according to the first embodiment, describing the structure of a control system of the same image forming apparatus.

As shown in FIG. 2, the image forming apparatus 1 contains a control unit 61 serving as a drive control unit for controlling each unit making up the image forming apparatus 1, a host interface (I/F) unit 63 for communicating with the information processing apparatus, not shown, an image control unit 65 for changing printing information received from the I/F unit 63 into image information of a prescribed format, a belt drive unit 67 for controlling the drive of the feeding apparatus 23 under the control of the control unit 61, ID drive units 69C, 69M, 69Y, and 69K serving as image formation drive units for controlling the drive of the development apparatuses 25C, 25M, 25Y, and 25K under the control of the control unit 61, and a feeding control unit 71 for controlling each unit disposed in the medium feeding path R1 under the control of the control unit 61.

The control unit 61 is made up of a CPU (Central Processing Unit), for example, and is driven by power supplied by a power source 73. Based on the detection result of a sensor group 73 made up of paper sensors 15, 21, and 55 and the printing information received by the I/F unit 63, each unit making the image forming apparatus 1 is controlled. Specifically, when notification that the printing information is sent is supplied to the control unit 61 from the I/F unit 63, the control unit 61 commands the image control unit 65 to generate the image information, commands the belt drive unit 67 to drive the feeding belt 23, commands the ID drive units 69C, 69M, 69Y, and 69K to drive the development apparatuses 25C, 25M, 25Y, and 25K, and commands the feeding control unit to drive every unit disposed in the medium feeding path R1.

The I/F unit 63 supplies to the image control unit 65 the printing information for generating the image information received from the information processing apparatus, not shown, and notifies the control unit 61 that the printing information for beginning the printing process is received.

The image control unit 65 generates the image data in a bitmap format, for example, based on the printing information supplied from the I/F unit 63 and the command from the control unit 61 and then supplies to the exposure apparatus 35 the image information for forming the latent image based on image information.

The belt drive unit 67 drives a belt motor 77 based on the command from the control unit 61. The belt motor 77 is a pulse motor that is driven according to a pulse signal supplied from the control unit 61. The belt drive unit 67 then controls the drive of the belt motor 77 by supplying a pulse wave to the belt motor 77. Because of the drive of such a belt motor 77, the driving force is transmitted to the drive motor 29 to drive the drive motor 29.

The ID drive units 69C, 69M, 69Y, and 69K control the drive of ID motors 79C, 79M, 79Y, and 79K for driving each unit making up the development apparatuses 25C, 25M, 25Y, and 25K based on the command from the control unit 61.

The feeding control unit 71 controls a drive motor 81 under the control of the control unit 61. The drive motor 81 is connected to the hopping roller 13, the paper supply rollers 17 and 19, and the feeding rollers 57 and 59. The driving force generated by the drive motor 81 is transmitted to the hopping roller 13, the paper supply rollers 17 and 19, and the feeding rollers 57 and 59 so that, when these units are driven upon receiving the driving force from the drive motor 81.

It is desirable that so-called brushless DC motors be used as the ID motors 79C, 79M, 79Y, and 79K. The ID motors 79C, 79M, 79Y, and 79K made from the brushless DC motors contain a Hall element for detecting the pulse phase of the motor, and the brushless DC motors switch the motor pulse phase using the Hall element. Furthermore, each of the brushless DC motors contain an encoder 83C, 83M, 83Y, and 83K for detecting the number of rotations of the motor and the detection results of the encoders 83C, 83M, 83Y, and 83K are supplied as a pulse wave to the ID drive units 69C, 69M, 69Y, and 69K. At this time, a clocking signal generated by the control unit 61 for controlling the number of rotations of the brushless DC motors is supplied to the ID drive units 69C, 69M, 69Y, and 69K by the control unit 61. The ID drive units 69C, 69M, 69Y, and 69K compare this clocking signal to the pulse wave provided by the encoders 83C, 83M, 83Y, and 83K, and control the increase and decrease of the electric current supplied by the ID motors 79C, 79M, 79Y, and 79K to synchronize the pulse wave supplied by the encoders 83C, 83M, 83Y, and 83K with the clocking signal and to switch the motor pulse phase of the brushless DC motors using the Hall element.

The acceleration and rotation speed of the photosensitive drums 37 driven by the ID motors 79C, 79M, 79Y, and 79K is influenced by a burden caused by contact with the charge roller 39, the supply roller 45, and the cleaning blade, not shown, disposed in the development apparatus 25 and also by the abrasive condition of the photosensitive drums 37. For example, according to a measurement result of the acceleration and rotation speed of a common photosensitive drum of the present invention, in an image forming apparatus containing multiple photosensitive drums, a time difference with a maximum of 150 mS exists until the rotation speed of the photosensitive drum reaches 200 mm/S. The difference in the feeding distance of the paper P by the photosensitive drum arising from the time difference is approximately 1.5 mm. That is, the sag existing in the feeding belt driven while contacting the photosensitive drum results from the difference of the acceleration speeds of the multiple photosensitive drums.

Furthermore, according to an observation of the inventor, a color shift arises in the developer image transferred onto the paper when there is a sag in the feeding belt, thereby reducing the quality of the image printed on the paper. Such image development is notably seen in a case where thin paper that easily sticks to the feeding belt is used. In addition, according to an observation of the inventor, it turns out that, in addition to the color shift, an error arises in a correction value for correction of the density of the developer by the image forming apparatus.

In the image forming apparatus, there is a case where a prescribed test pattern is printed on the feeding belt at a time when printing is initiated, the color of the test pattern is detected by a prescribed sensor, and the density of the developer forming the developer image is corrected according to the detection result, but in a case where a sag arises in the feeding belt, a color shift is generated at the time when the test pattern is printed. Because such an image forming apparatus then creates the correction value based on the value detected from the test pattern generated with the color shift and corrects the density of the developer accordingly, the image forming apparatus cannot print the developer image of the color desired by the user onto the paper.

Figure 3:
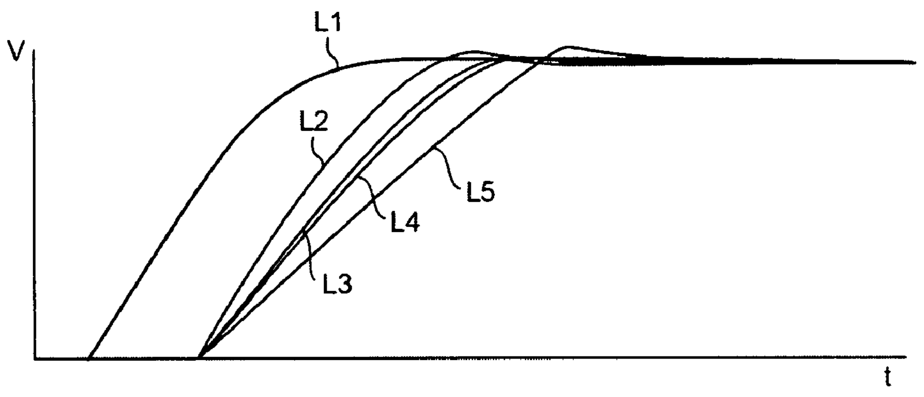
FIG. 3 is a graph showing a relationship between acceleration of the feeding belt and the photosensitive drums in the conventional image forming apparatus.

To remove the sag in the feeding belt that causes such a problem, as shown in FIG. 3, the feeding apparatus is driven before the photosensitive drum is made to rotate and the drive of the photosensitive drum is initiated after one rotation of the feeding belt. In addition, in FIG. 3, the change in speed of the feeding belt is represented by a curved line L1 and the changes in the rotation speed of the four photosensitive drums 37C, 37M, 37Y, and 37K are represented by curved lines L2, L3, L5, and L4, respectively. As shown in FIG. 3, because there is a dispersion in the time it takes for the photosensitive drums 37C, 37M, 37Y, and 37K to reach the prescribed speed, for example the photosensitive drum 37K reaches the prescribed speed in a short amount of time but the photosensitive drum 37Y reaches the prescribed speed in a long amount of time, a sag arises between the photosensitive drum 37K and the photosensitive drum 37Y. To remove this sag, it is necessary to make the feeding belt rotate multiple times. Such a case is not desirable because a certain amount of time is necessary for the image forming apparatus to reach a condition in which printing is possible.

Figure 4:
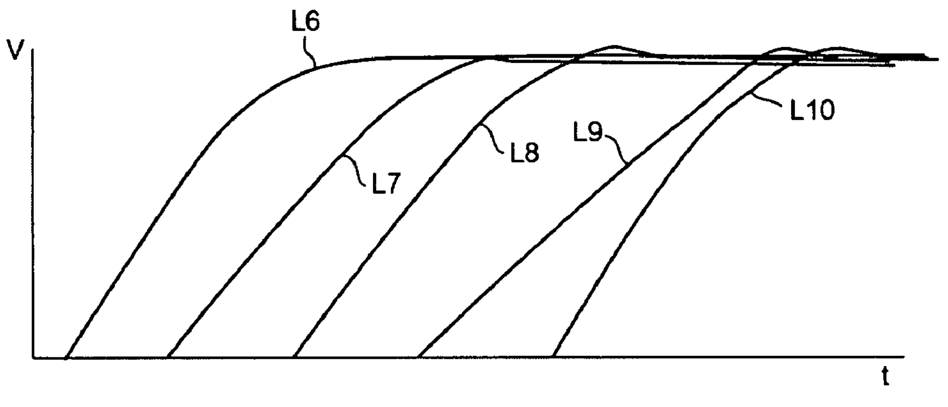
FIG. 4 is a graph showing a relationship between acceleration of the feeding belt and the photosensitive drums in the image forming apparatus according to the first embodiment.

Therefore, the control unit 61 of the image forming apparatus 1 commands the belt drive unit 67 to drive the feeding apparatus 23 and commands the ID drive units 69C, 69M, 69Y, and 69K to begin sequentially driving the photosensitive drums 37C, 37M, 37Y, and 37K in a direction downstream in the medium feeding path R1. In such a manner, by the sequential driving from the photosensitive drums 37 disposed in a direction downstream in the medium feeding path R1, the sag arising in the feeding belt 31 can be removed. Specifically, at a time when the control unit 61 initiates the printing process by commanding the belt drive unit 67 to drive the feeding apparatus 23, the belt drive unit 67 supplies to the belt motor 77 the pulse wave of the previously determined pulse section and belt motor 77 supplied with this pulse wave moves the feeding belt 31 by rotating only the amount of distance corresponding to the pulse wave. In the present embodiment, to allow a convenient description, it is assumed that the feeding belt 31 moves 20 mm at a time when a pulse wave of 20 pulse sections is supplied to the belt motor 77 from the belt drive unit 67. When the pulse wave is supplied to the belt motor 77 from the belt drive unit 67, the feeding belt 31 increases in a manner represented by a curved line L6 of FIG. 4.

At a time when the feeding belt 31 has moved 20 mm, the control unit 61 commands the ID drive unit 69C to drive the photosensitive drum 37C disposed furthest downstream in the medium feeding path R1. The ID drive unit 69C that receives this command from the control unit 61 then drives the photosensitive drum 37C by initiating the driving of the ID motor 79C. At this time, the photosensitive drum 37C increases in a manner shown by a curved line L7.

As described above, a time difference with a maximum of 150 mS exists until the rotation speed of the photosensitive drums 37 reaches 200 mm/S. That is, the sag of the feeding belt 31 can be eliminated by sequentially driving the photoconductive drums 37C, 37M, 37Y, and 37K with a time difference greater than 150 mS. In the present embodiment, to drive the photosensitive drum 37M disposed furthest upstream from the photosensitive drum 37C after 150 mS have passed since the photosensitive drum 37C accelerated, the control unit 61 commands the ID drive unit 69M to drive the photoconductive drum 37M. The photosensitive drum 37M then accelerates in a manner shown by a curved line L8 until it reaches a substantially constant speed.

Next, the same process is executed for the photosensitive drum 37Y and the photosensitive drum 37K, whereby the control unit 61 then commands the ID drive unit 69Y and the ID drive unit 69K to begin driving after 150 mS have passed since the downstream photosensitive drum 37 accelerated. The photosensitive drum 37Y and the photosensitive drum 37K are controlled by the ID drive unit 69Y and the ID drive unit 69K accelerate in a manner shown by curved lines L9 and L10 respectively. In addition, the aforementioned value of 150 mS is a value inherent to the apparatus and it is therefore necessary that the actual value be changed for each apparatus.

Figure 5:
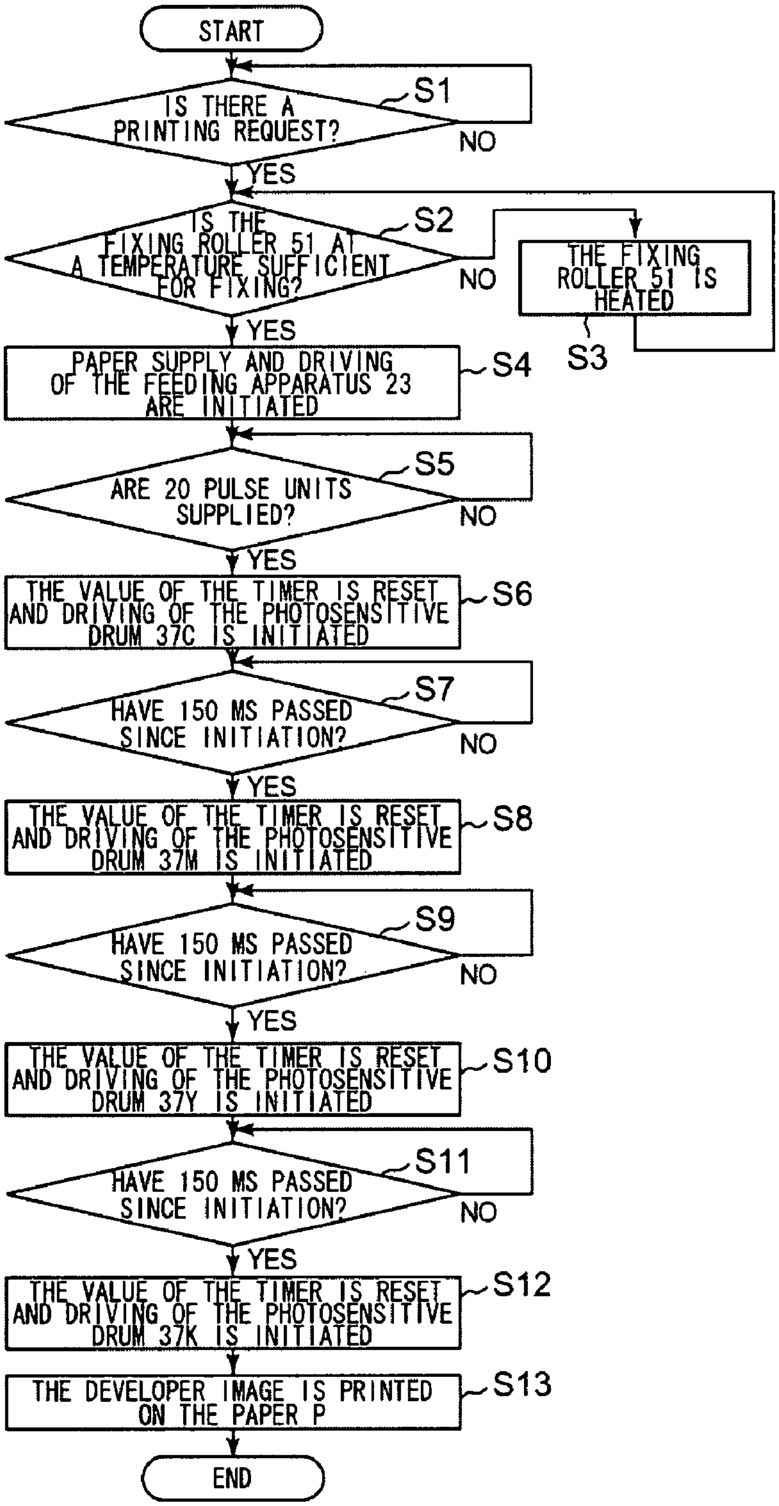
FIG. 5 is a flow chart showing a performance of the image forming apparatus according to the first embodiment and describing the performance at a time of a printing process of the same image forming apparatus.

The following is a detailed description, referencing FIG. 5, of the performance at a time when the printing process is executed by the image forming apparatus 1.

When this chain of operations is initiated, the control unit 61, at step S1, makes a judgment as to whether printing data has been sent from the information processing apparatus, not shown. In a case where a judgment is made that printing data has not been sent from the information processing apparatus, this judgment is repeated until printing information is sent.

Where the control unit 61 makes a judgment at step S1 that printing data has been sent from the information processing apparatus, the control unit 61, at step S2, detects the surface temperature of the fixing roller 51 using a temperature sensor, not shown, and makes a judgment as to whether the surface temperature of the roller 51 has reached a temperature at which the developer image can be fixed to the paper P. At step S2, in a case where the control unit 61 makes a judgment that the temperature of the fixing roller 51 is not sufficient for fixing, the control unit 61, at step S3, heats the surface of the fixing roller 51 by having a heat source, not shown, heat the fixing roller 51. The control unit 61 then repeats the operations of step S2 and step S3 until the surface temperature of the fixing roller 51 is sufficient for fixing.

At step S2, in a case where the control unit 61 makes a judgment that the temperature of the fixing roller 51 is sufficient for fixing, the control unit 61, at step S4, commands the belt drive unit 67 to initiate driving of the feeding apparatus 23.

Where driving of the feeding apparatus 23 is initiated, the control unit 61, at step S5, makes a judgment as to whether the pulse wave of 20 pulse sections is supplied to the belt motor 77 from the belt drive unit 67. In a case where the control unit 61 makes a judgment that the pulse wave of 20 pulse sections is not yet supplied, the judgment is repeated until the pulse wave of 20 pulse sections is supplied to the belt motor 77.

At step S5, in a case where the control unit 61 makes a judgment that the pulse wave of 20 pulse sections has been supplied to the belt motor 77 by the belt drive unit 67, the control unit 61, at step S6, resets the value of a timer, not shown, and commands the ID drive unit 69C to initiate driving of the photosensitive drum 37C.

Next, at step S7, the control unit 61 makes a judgment as to whether the value of the timer, not shown, has reached 150 mS. In a case where the control unit 61 makes a judgment that the value of the timer has not reached 150 mS, the judgment is repeated until the value of the timer reaches 150 mS.

At step S7, in a case where the control unit 61 makes a judgment that the value of the timer has reached 150 mS, the control unit 61, at step S8, resets the value of a timer, not shown, and commands the ID drive unit 69M to initiate driving of the photosensitive drum 37M.

Next, at step S9, the control unit 61 makes a judgment as to whether the value of the timer, not shown, has reached 150 mS. In a case where the control unit 61 makes a judgment that the value of the timer has not reached 150 mS, the judgment is repeated until the value of the timer reaches 150 mS.

At step S9, in a case where the control unit 61 makes a judgment that the value of the timer has reached 150 mS, the control unit 61, at step S10, resets the value of a timer, not shown, and commands the ID drive unit 69Y to initiate driving of the photosensitive drum 37Y.

Next, at step S11, the control unit 61 makes a judgment as to whether the value of the timer, not shown, has reached 150 mS. In a case where the control unit 61 makes a judgment that the value of the timer has not reached 150 mS, the judgment is repeated until the value of the timer reaches 150 mS.

At step S11, in a case where the control unit 61 makes a judgment that the value of the timer has reached 150 mS, the control unit 61, at step S12, resets the value of a timer, not shown, and commands the ID drive unit 69K to initiate driving of the photosensitive drum 37K.

Next, at step S13, the image forming apparatus 1 executes the aforementioned printing process and the series of operations is ended.

Above, in the image forming apparatus 1, because the photoconductive drums 37C, 37M, 37Y, and 37K are sequentially driven in a direction downstream in the medium feeding path R1 under the control of the control unit 61, the sag of the feeding belt 31 between each of the photosensitive drums 37C, 37M, 37Y, and 37K can be eliminated, the color shift generated by the sag of the feeding belt 31 can be suppressed, and a high quality developer image can be formed on the paper P. Furthermore, because it is not necessary to make the feeding belt 31 rotate multiple times to eliminate the sag, the overall throughput of the printing is favorable.

Next, a detailed description of the second embodiment according to the present invention will be given.

In the image forming apparatus according to the second embodiment, because there are parts having a structure identical to that of the first embodiment, those parts are given the same numbering in the following detailed explanation.

Figure 6:
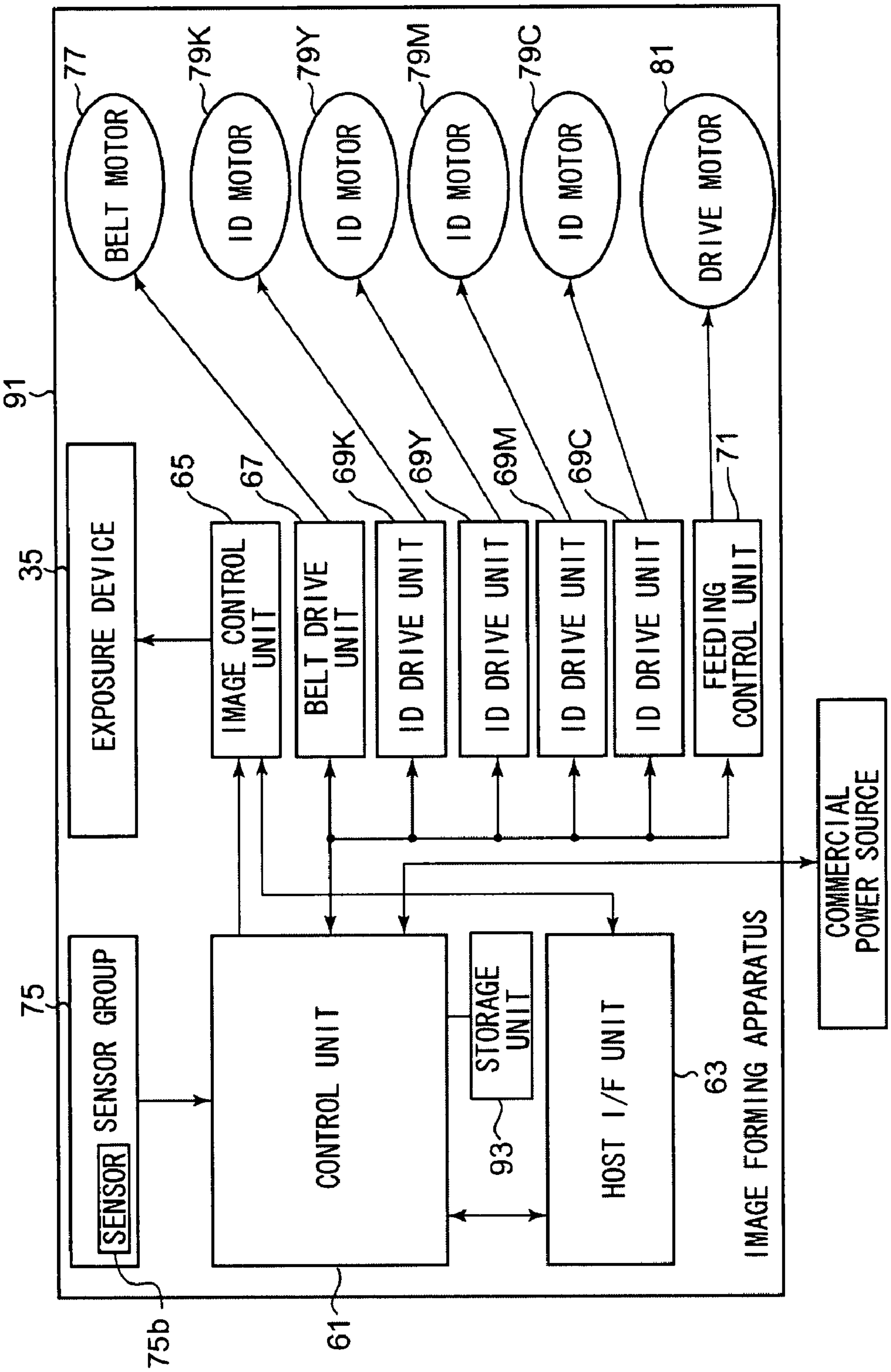
FIG. 6 is a block diagram of the image forming apparatus according to a second embodiment, describing the structure of a control system of the same image forming apparatus.

As shown in FIG. 6, the image forming apparatus 91 according to the second embodiment contains a storage unit 93 for storing prescribed information in addition to having the same structure as the image forming apparatus 1.

The storage unit 93 is made up of an EEPROM (Electronically Erasable and Programmable Read Only Memory), for example, for storing a correction value relating to the time difference in the time for driving the photosensitive drums 37.

As described above, the acceleration and rotation speed of the photosensitive drums 37 is influenced by a burden caused by contact with the charge roller 39, the supply roller 45, and the cleaning blade, not shown, disposed in the development apparatus 25 and also by the abrasive condition of the photosensitive drums 37. Therefore, these elements change over time. The image forming apparatus 91 can print a high quality image by periodically correcting the timing of the driving of the photosensitive drums 37 based on the correction value stored in the storage unit 93.

The correction value is calculated by the control unit 61. Specifically, as a method for calculating the correction value, the image forming apparatus 91 contains a speed sensor 75*b*, as part of a sensor group 75, and detects that the rotation speed of each of the photosensitive drums 37 has reached the prescribed speed using the speed sensor 75*b*, and the speed sensor supplies the control unit 61 with a lock signal notifying the control unit 61 that the photosensitive drums 37 have reached the prescribed speed. The control unit 61 then measures the time period from when driving of the photosensitive drums 37 is initiated to when the lock signal is supplied and calculates the correction value based on the measurement result. The correction value is determined by the difference between the rotation speed of the photosensitive drum 37 on an upstream side and the rotation speed of the photosensitive drum 37 on a downstream side, based on the time necessary during the printing process for the rotation speed of an arbitrary photosensitive drum 37 to reach the prescribed speed and on the time the necessary for the rotation speed of another photosensitive drum 37, which is adjacent in an upstream direction in the medium feeding path R1 to the aforementioned photosensitive drum 37, to reach the prescribed speed. The control unit 61 adds the correction value to the time used when measuring the rotation speed of the photosensitive drum 37 and sets this total as the time for initiating driving of the photosensitive drums 37 during the next printing process.

For example, the time necessary for photosensitive drum 37C to reach the prescribed rotation speed is set as t1 and the time necessary for the photosensitive drum 37M to reach the prescribed rotation speed is set as t2. At this time, based on these values, the control unit 61 calculates the correction value that determines the time for initiating driving of the photosensitive drum 37M. Specifically, the control unit 61 calculates the difference between the time t1 and the time t2 and stores in the storage unit 93 a value, which is the error value (for example, 20 mS) added to the calculation result, as the time correction value for initiating driving of the photosensitive drum 37M. In the same manner, the control unit 61 calculates the correction value that determines the time for initiating driving of the photosensitive drum 37Y based on the time t2 and the time t3, which is the time necessary for the photosensitive drum 37Y to reach the prescribed rotation speed, and the correction value that determines the time for initiating driving of the photosensitive drum 37K based on the time t3 and the time t4, which is the time necessary for the photosensitive drum 37K to reach the prescribed rotation speed. In addition, in a case where the difference between t(n−1) and tn is negative, the 20 mS error value is determined to be the correction value.

The following is a detailed description of the performance of the image forming apparatus 91.

Figure 7:
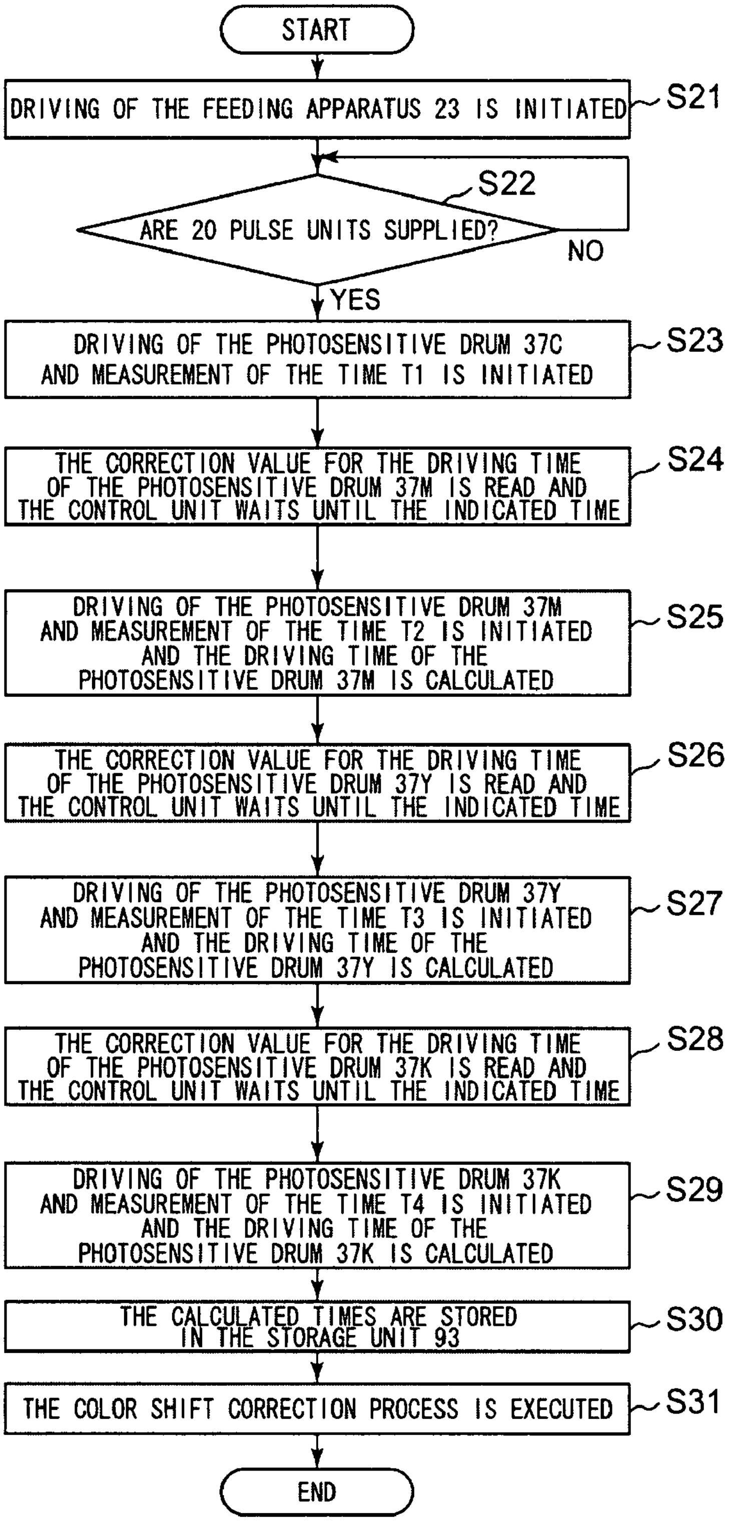
FIG. 7 is a flow chart showing a performance of the image forming apparatus according to the second embodiment and describing the performance during a color shift correction process executed by the same image forming apparatus.
Figure 8:
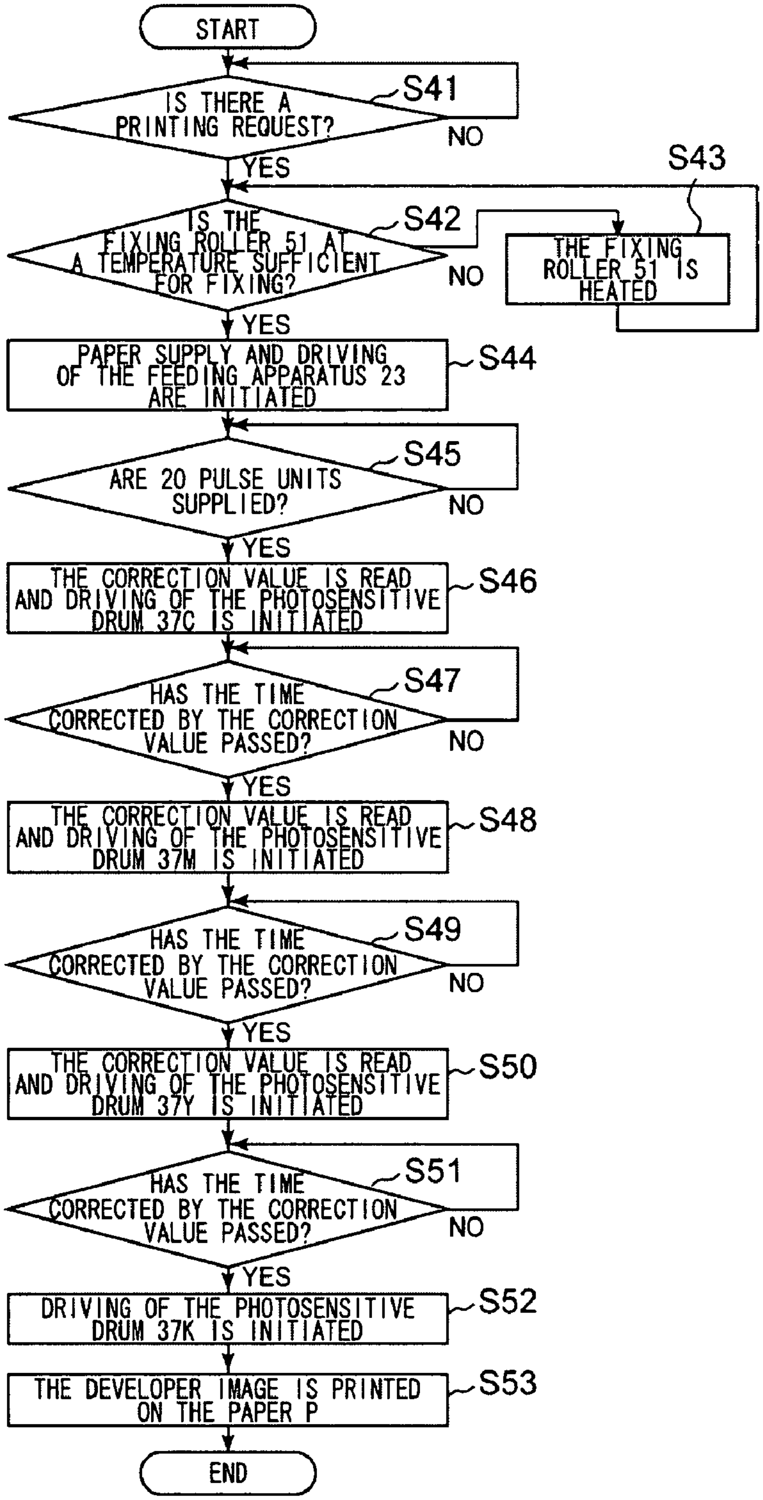
FIG. 8 is a flow chart showing a performance of the image forming apparatus according to the second embodiment and describing the performance at the time of the printing process of the same image forming apparatus.

First, a detailed description will be given, referencing FIG. 7, concerning the operation for generating the correction value in a case where color shift correction is executed at a time when the image forming apparatus 91 is switched on.

At a time when the correction value is generated, at step S21, the control unit 61 initiates driving of the feeding apparatus 23 to rotate the feeding belt 31.

Next, at step S22, the control unit 61 makes a judgment as to whether the pulse wave of 20 pulse sections has been supplied to the belt motor 77 from the belt drive unit 67. In a case where the pulse wave of 20 pulse sections has not yet been supplied, the judgment is repeated until the pulse wave of 20 pulse sections is supplied to the belt motor 77.

Next, at step 22, in a case where the control unit 61 makes a judgment that the pulse wave of 20 pulse sections has been supplied to the belt motor 77 by the belt drive unit 67, the control unit 61, at step S23, initiates driving of the photosensitive drum 37C and also initiates time measurement of t1, which is the time necessary for the photosensitive drum 37C to reach the prescribed rotation speed, using a timer, not shown. At this time, although not shown in the flow chart, the control unit 61 measures the time from when driving of the photosensitive drum 37C is initiated to when the rotation speed of the photosensitive drum 37C reaches the prescribed speed.

Next, at step S24, the control unit 61 reads from the storage unit 93 the correction value of the time for initiating driving of the photosensitive drum 37M and waits until this time has passed.

Next, at step S25, the control unit 61 initiates driving of the photosensitive drum 37M, initiates time measurement of t2, which is the time necessary for the photosensitive drum 37M to reach the prescribed rotation speed, using a timer, not shown, and calculates the driving time of the photosensitive drum 37M. The driving time of the photosensitive drum 37M is calculated using the formula time t1−time t2+20 mS correction value. At this time, although not shown in the flow chart, the control unit 61 measures the time from when driving of the photosensitive drum 37M is initiated to when the rotation speed of the photosensitive drum 37M reaches the prescribed speed.

Next, at step S26, the control unit 61 reads from the storage unit 93 the correction value of the time for initiating driving of the photosensitive drum 37Y and waits until this time has passed.

Next, at step S27, the control unit 61 initiates driving of the photosensitive drum 37Y, initiates time measurement of t2, which is the time necessary for the photosensitive drum 37Y to reach the prescribed rotation speed, using a timer, not shown, and calculates the driving time of the photosensitive drum 37Y. The driving time of the photosensitive drum 37Y is calculated using the formula time t2−time t3+20 mS correction value. At this time, although not shown in the flow chart, the control unit 61 measures the time from when driving of the photosensitive drum 37Y is initiated to when the rotation speed of the photosensitive drum 37Y reaches the prescribed speed.

Next, at step S28, the control unit 61 reads from the storage unit 93 the correction value of the time for initiating driving of the photosensitive drum 37K and waits until this time has passed.

Next, at step S29, the control unit 61 initiates driving of the photosensitive drum 37K, initiates time measurement of t4, which is the time necessary for the photosensitive drum 37K to reach the prescribed rotation speed, using a timer, not shown, and calculates the driving time of the photosensitive drum 37K.

Next, at step S30, the control unit 61 stores the calculated time in the storage unit 93. Specifically, the control unit 61 stores in the storage unit 93 the time necessary for the photosensitive drum 37C to reach the prescribed rotation speed, the time necessary for the photosensitive drum 37M to reach the prescribed rotation speed, the time necessary for the photosensitive drum 37Y to reach the prescribed rotation speed, and the time necessary for the photosensitive drum 37K to reach the prescribed rotation speed.

Next, at step S31, the control unit 61 executes the aforementioned color shift correction. At this time, the time at which driving of each of the photosensitive drums 37 is initiated is the time based on the time corrected by the correction value generated from the time stored in the storage unit 93. The image formation apparatus 91 ends the series of processes after executing the color shift correction.

In the image forming apparatus 93, because the color shift is corrected by the aforementioned process, a precise correction value can be achieved and the sag in the feeding belt can be eliminated even at a time when color correction is executed.

The following is a detailed explanation concerning the performance of the image forming apparatus 91 during the printing process. In addition, to facilitate the description, the description will be given in relation to the performance of the image forming apparatus 91 during the (n+1)th printing process.

When this chain of operations is initiated, the control unit 61, at step S41, makes a judgment as to whether printing data has been sent from the information processing apparatus, not shown. In a case where a judgment is made that printing data has not been sent from the information processing apparatus, this judgment is repeated until printing information is sent.

Where the control unit 61 makes a judgment at step S41 that printing data has been sent from the information processing apparatus, the control unit 61, at step S42, detects the surface temperature of the fixing roller 51 using a temperature sensor, not shown, and makes a judgment as to whether the surface temperature of the roller 51 has reached a temperature at which the developer image can be fixed to the paper P. At step S42, in a case where the control unit 61 makes a judgment that the temperature of the fixing roller 51 is not sufficient for fixing, the control unit 61, at step S43, heats the surface of the fixing roller 51 by having a heat source, not shown, heat the fixing roller 51. The control unit 61 then repeats the operations of step S42 and step S43 until the surface temperature of the fixing roller 51 is sufficient for fixing.

At step S42, in a case where the control unit 61 makes a judgment that the temperature of the fixing roller 51 is sufficient for fixing, the control unit 61, at step S44, commands the belt drive unit 67 to initiate driving of the feeding apparatus 23.

Where driving of the feeding apparatus 23 is initiated, the control unit 61, at step S45, makes a judgment as to whether the pulse wave of 20 pulse sections is supplied to the belt motor 77 from the belt drive unit 67. In a case where the control unit 61 makes a judgment that the pulse wave of 20 pulse sections is not yet supplied, the judgment is repeated until the pulse wave of 20 pulse sections is supplied to the belt motor 77.

At step S45, in a case where the control unit 61 makes a judgment that the pulse wave of 20 pulse sections has been supplied to the belt motor 77 by the belt drive unit 67, the control unit 61, at step S46, reads the correction value stored in the storage unit 93 at the time of the nth printing process. At this time, the control unit 61 also commands the ID drive unit 69C to initiate driving of the photosensitive drum 37C.

Next, at step S47, the control unit 61 makes a judgment as to whether the value of the timer, not shown, has reached the time corrected by the correction value. In a case where the control unit 61 makes a judgment that the value of the timer has not reached the time corrected by the correction value, the judgment is repeated until the value of the timer reaches this time.

At step S47, in a case where the control unit 61 makes a judgment that the value of the timer has reached the corrected time, the control unit 61, at step S48, reads the correction value stored in the storage unit 93 at the time of the nth printing process. At this time, the control unit 61 also commands the ID drive unit 69M to initiate driving of the photosensitive drum 37M.

Next, at step S49, the control unit 61 makes a judgment as to whether the value of the timer, not shown, has reached the time corrected by the correction value. In a case where the control unit 61 makes a judgment that the value of the timer has not reached the time corrected by the correction value, the judgment is repeated until the value of the timer reaches this time.

At step S49, in a case where the control unit 61 makes a judgment that the value of the timer has reached the corrected time, the control unit 61, at step S50, reads the correction value stored in the storage unit 93 at the time of the nth printing process. At this time, the control unit 61 also commands the ID drive unit 69Y to initiate driving of the photosensitive drum 37Y.

Next, at step S51, the control unit 61 makes a judgment as to whether the value of the timer, not shown, has reached the time corrected by the correction value. In a case where the control unit 61 makes a judgment that the value of the timer has not reached the time corrected by the correction value, the judgment is repeated until the value of the timer reaches this time.

At step S51, in a case where the control unit 61 makes a judgment that the value of the timer has reached the corrected time, the control unit 61, at step S52, commands the ID drive unit 69K to initiate driving of the photosensitive drum 37K.

The control unit 61 then executes the aforementioned printing process and ends the series of processes.

Above, in the image forming apparatus 91, because the photoconductive drums 37C, 37M, 37Y, and 37K are sequentially driven in a direction downstream in the medium feeding path R1 under the control of the control unit 61, the sag of the feeding belt 31 between each of the photosensitive drums 37C, 37M, 37Y, and 37K can be eliminated, the color shift generated by the sag of the feeding belt 31 can be suppressed, and a high quality developer image can be formed on the paper P.

The present invention is not limited to the embodiments described above and can be arbitrarily altered without deviating from the general form of the present invention.

For example, the EEPROM is used as the storage apparatus 93 of the second embodiment, but a RAM (Random Access Memory) may also be used. In such a case, it is necessary to execute the color shift correction process every time the image forming apparatus 91 is switched on.

Furthermore, in the second embodiment, the measurement of the time for generating the correction value is executed concurrently with the color shift correction process, but the time measuring process and correction process may be executed independently as long they are executed at the same time as the printing process.

Figure 9:
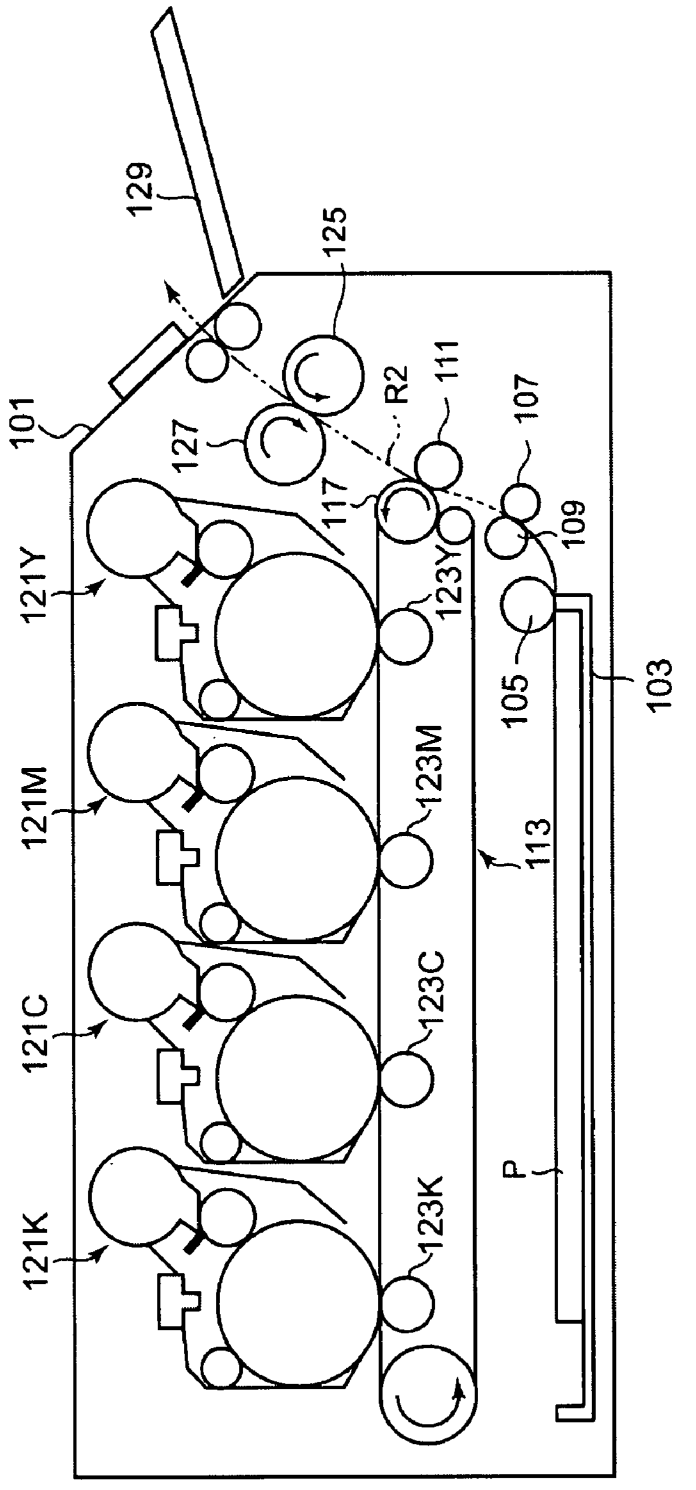
FIG. 9 is a cross sectional diagram of the image forming apparatus showing a different version of the present invention.

Yet further, the image forming apparatus 1 and the image forming apparatus 91 are described as using a so-called tandem printer, but as shown in FIG. 9, the present invention may also be applied to an intermediate transfer image forming apparatus 101.

The image forming apparatus 101, using the hopping roller 105, sends out the paper P stored in a stacker 103 in the direction of the medium feeding path R2. The paper P that is sent out is then is then fed in a downstream direction in the medium feeding path R2 by the feeding roller 107 and the feeding roller 109. In addition, in the medium feeding path R2, the transfer roller 111 is disposed to press against the transfer belt 113.

The transfer belt 113 stretches across the drive roller 115, a pressing roller 117, and the support roller 119. The developer image based on the printing information is transferred on the surface of the transfer belt 113 by the development apparatuses 121C, 121M, 121Y, and 121K and the transfer rollers 123C, 123M, 123Y, and 123K.

When the paper P is sent out in a downstream direction in the medium feeding path R2 by the feeding roller 107 and the feeding roller 109, the developer images based on the printing information are sequentially transferred on the transfer belt 113 corresponding to the timing at which the paper P reaches a location where the transfer roller 111 presses against the transfer belt 113. The developer image is then transferred onto the paper P by having the paper P sandwich and fed by the transfer roller 11 and the pressing roller 117 with the timing described above. The paper P onto which the developer image is transferred is then fed to the fixing roller 125 and the pressure roller 127 located further downstream in the medium feeding path R2. The developer image on the surface of the paper P is then fixed onto the paper P by having the paper P sandwiched and fed by the fixing roller 125 and the pressure roller 127. Finally, the paper P is sent out in a further downstream direction in the medium feeding path R2, ejected to the stacker 129 formed outside of the image forming apparatus 101, and thereby supplied to the user.

In the type of image forming apparatus 101 described above, the sag of the transfer belt 113 can be eliminated by using the control unit, not shown, to control the time at which driving of the photosensitive drums 131C, 131M, 131Y, and 131K is initiated. By eliminating the sag of the transfer belt 113, the color shift of the developer image transferred on the transfer belt 113 and the developer image transferred onto the paper P from the transfer belt can be prevented, thereby providing a high quality developer image.

As a specific control method, the control unit, not shown, initiates driving of the photosensitive drum 131K of the development apparatus 121K disposed furthest downstream in the driving direction of the transfer belt 113, after driving of the transfer belt 113 is initiated. After the prescribed has passed since the initiation of the driving of the photosensitive drum 131K, the control unit, not shown, initiates driving of the photosensitive drum 131C of the development apparatus 121C disposed adjacently upstream to the development apparatus 121K in the driving direction of the transfer belt 113. In the same manner, the control unit, not shown, then sequentially initiates driving of the photosensitive drum 131M of the development apparatus 121M and the photosensitive drum 131Y of the development apparatus 121Y.

Through the type of image forming apparatus 101 described above, the quality of the high quality developer image achieved by a common intermediate transfer image forming apparatus can further be increased because the sag of the transfer belt 113 can be eliminated by having the control unit, not shown, control the photosensitive drum 131.

Furthermore, the type of image forming apparatus 101 described above may also execute the color shift correction process in a manner similar to the image forming apparatus 91.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image forming apparatus having multiple image forming units each including an image carrier for forming a developer image, the image carriers being arranged along a prescribed medium feeding path in a manner to face and rotationally contact a belt component, the image forming apparatus comprising:

an image formation driving unit for driving the multiple image forming units;

a belt component driving unit for driving the belt component; and a drive control unit for supplying a drive command to the belt component driving unit and the image formation driving unit, so as to initiate driving of the belt component drive unit, and, after the belt component drive unit is started to drive, subsequently initiate driving of the image forming units to sequentially rotate the image carriers, from a most downstream one to a most upstream one with respect to a medium feeding direction along the medium feeding path, each of the image carriers, except for the most downstream one, being initiated to rotate after a prescribed period has passed since its immediate preceding image carrier is initiated to rotate, the drive control unit controlling the image carrier to start to rotate after a maximum time difference, or a time longer than the maximum time difference, has passed since the immediate preceding image carrier starts to rotate, and before the immediate preceding image carrier reaches a substantially constant prescribed speed, wherein the maximum time difference is a maximum value of a difference of time that each image carrier requires to reach a prescribed speed.

2. The image forming apparatus according to claim 1, wherein the drive control unit initiates the driving of the image forming units in a prescribed interval.

3. The image forming apparatus according to claim 1, further comprising:

a detection unit for detecting that a driving speed of the image forming unit has reached the prescribed speed; and a correction unit for generating a correction value for correcting a drive initiation time of the image forming unit based on a detection result by the detection unit, wherein the drive control unit initiates driving of the image forming unit based on the correction value generated by the correction unit.

4. The image forming apparatus according to claim 3, wherein the correction unit generates the correction value based on a difference between the time necessary for the driving speed of an arbitrary image forming unit detected by the detection unit to reach the prescribed speed and the time necessary for the driving speed of the image forming unit adjacent to the arbitrary image forming unit to reach the prescribed speed.

5. The image forming apparatus according to claim 1, wherein the belt component is a feeding belt for feeding a recording medium onto which the developer formed by the image apparatus is transferred.

6. The image forming apparatus according to claim 1, wherein the belt component is a transfer belt for transferring the developer image formed by the image apparatus is transferred.

7. The image forming apparatus according to claim 1, further comprising a brushless DC motor for generating movement transmitted to the image forming units under the control of the drive control unit.

* * * * *